Dec. 30, 1969  O. B. NOREN  3,486,982
APPARATUS FOR HARVESTING LIQUID VIRAL PRODUCTS FROM EGGS
Filed Dec. 29, 1966  6 Sheets-Sheet 1

INVENTOR
OSCAR B. NOREN

BY Barnes, Kisselle, Raisch & Choate
ATTORNEYS

Dec. 30, 1969   O. B. NOREN   3,486,982
APPARATUS FOR HARVESTING LIQUID VIRAL PRODUCTS FROM EGGS
Filed Dec. 29, 1966   6 Sheets-Sheet 4

FIG. 4

INVENTOR
OSCAR B. NOREN

BY Barnes, Kisselle, Raisch & Choate
ATTORNEYS

Dec. 30, 1969  O. B. NOREN  3,486,982
APPARATUS FOR HARVESTING LIQUID VIRAL PRODUCTS FROM EGGS
Filed Dec. 29, 1966  6 Sheets-Sheet 5

INVENTOR
OSCAR B. NOREN

BY Barnes, Kisselle, Raisch & Choate

ATTORNEYS

Dec. 30, 1969     O. B. NOREN     3,486,982
APPARATUS FOR HARVESTING LIQUID VIRAL PRODUCTS FROM EGGS
Filed Dec. 29, 1966     6 Sheets-Sheet 6

INVENTOR
OSCAR B. NOREN
BY Barnes, Kisselle, Raisch & Choate
ATTORNEYS

United States Patent Office 3,486,982
Patented Dec. 30, 1969

3,486,982
APPARATUS FOR HARVESTING LIQUID VIRAL PRODUCTS FROM EGGS
Oscar B. Noren, Grosse Pointe Farms, Mich., assignor to Parke, Davis & Company, Detroit, Mich., a corporation of Michigan
Filed Dec. 29, 1966, Ser. No. 605,631
Int. Cl. C12k 7/00, 9/00
U.S. Cl. 195—127      15 Claims

ABSTRACT OF THE DISCLOSURE

Apparatus for harvesting liquid viral products from eggs comprising an automatic machine operable to transport, locate and fixture a plurality of hens eggs or the like while the same are arranged in a predetermined fashion on an egg-flat tray or similar support and after the eggs have been decapitated and the upper exposed surface of the allantoic membrane of the inoculated, semi-developed egg has been torn open. The machine automatically lowers an array of aspirating heads into the open upper ends of the eggs, the heads camming aside the solid organs within the eggs. The liquid contents of the eggs are then aspirated via the heads and a collector manifold, following which the heads are withdrawn, the tray advanced and the cycle repeated.

---

This invention relates to the manufacture of biologicals and more particularly to apparatus for harvesting virus bearing liquid from eggs or the like in which the virus has been propagated by incubation of the egg after injection of seed virus into the egg.

Influenza virus vaccine production has hitherto been performed manually under government standards which specify incubation of chicken eggs for eleven days, candling inspection of the eggs after the eleven-day incubation, inoculation of the egg with influenza seed virus, incubation for another two days to propagate the virus within the egg, handling inspection of the inoculated eggs, an overnight chill followed by cutting open the eggs, and then harvesting of the infected liquid from the egg for centrifuging and further processing into influenza vaccine.

An object of the present invention is to provide apparatus for mechanizing and automating the harvesting phase of virus production to thereby economically increase production capacity and greatly reduce the cost of vaccine production.

Other objects, features and advantages of the present invention will become apparent from the following detailed description taken in conjunction with the accompanying drawings wherein.

The preferred embodiment of a virus harvesting apparatus of the present invention as illustrated by way of example herein comprises an automatic machine which is operable to transport, locate and fixture a plurality of hen's eggs 20 while the same are arranged in a predetermined fashion on two identical egg flats or trays 22 and 22' after the eggs have been decapitated and the upper exposed surface of the allantoic membrane of the inoculated, semi-developed egg has been torn open, these preparatory operations preferably having been performed automatically by the apparatus disclosed in my copending application Ser. No. 605,888, filed Dec. 29, 1966, entitled "Machine for Opening Eggs to Permit Removal of Viral Products Therefrom." The machine of the present invention is operable to automatically lower an array of aspirating heads 24, also constructed in accordance with the present invention, individually and simultaneously into the open ends of the eggs in a particular manner as described hereinafter to cam aside the solid organs within the eggs, and to aspirate via heads 24 the liquid contents of the eggs in which the seed virus has been propagated during incubation of the egg. Heads 24 may be operated manually or mechanically to perform the harvesting operation on one or a few such eggs as well as simultaneously on a large quantity of eggs such as the lot of seventy-two eggs illustrated herein. After heads 24 are withdrawn from the eggs, the machine automatically simultaneously releases the two trays of harvested eggs so that the same are propelled from the work station, the machine resetting itself so that it repeats the fixturing and harvest operation on the next successive trays in response to arrival of both such trays at their respective work stations in the machine.

HARVESTING HEAD

Figures 1, 9:
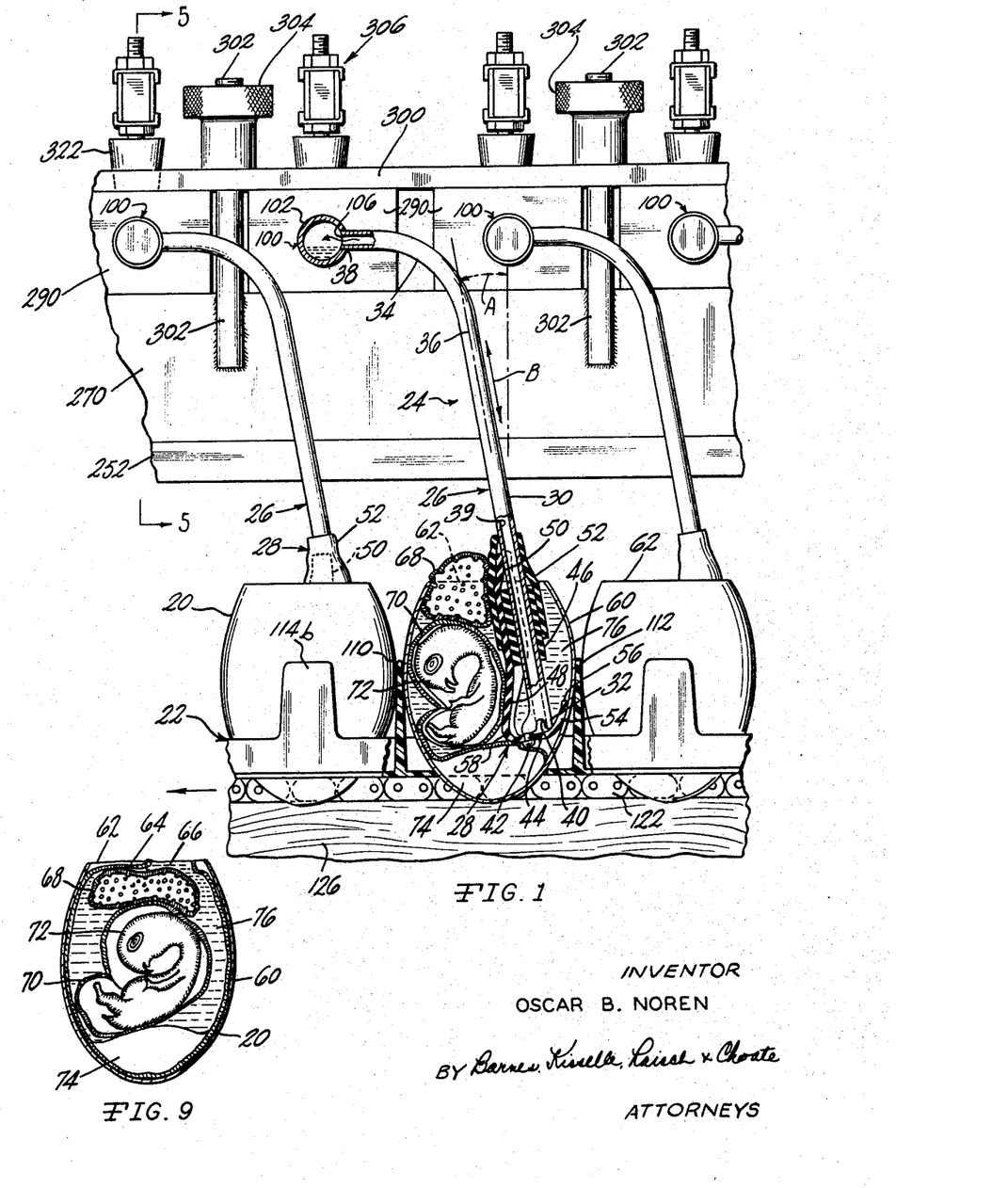
FIG. 1 is an enlarged fragmentary side elevational view of a portion of the harvesting machine of the present invention illustrating a harvesting head inserted into the open upper end of an egg to aspirate the infected liquid therefrom, portions being broken away and shown in center section to better illustrate details.
FIG. 9 is a vertical section of an egg shown by itself ready for harvesting prior to insertion therein of an aspirator head of the invention.
Figure 2:
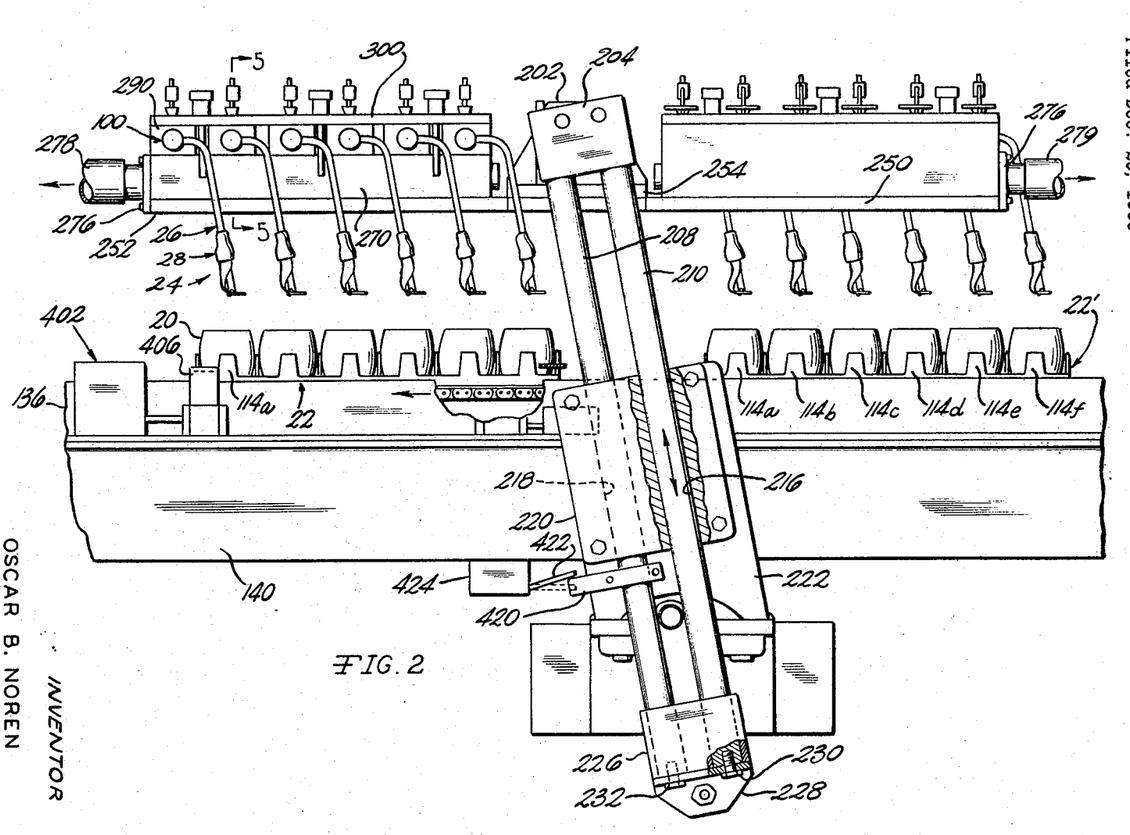
FIGS. 2, 3 and 4 are side elevational, end elevational and top plan views respectively of the machine illustrating and top plan views respectively of the machine illustrating a dual array of heads on the carrier of the machine arranged for simultaneously harvesting two trays of eggs transported side by side on a dual conveyor of the machine, portions being broken away to better illustrate details.
Figure 3:
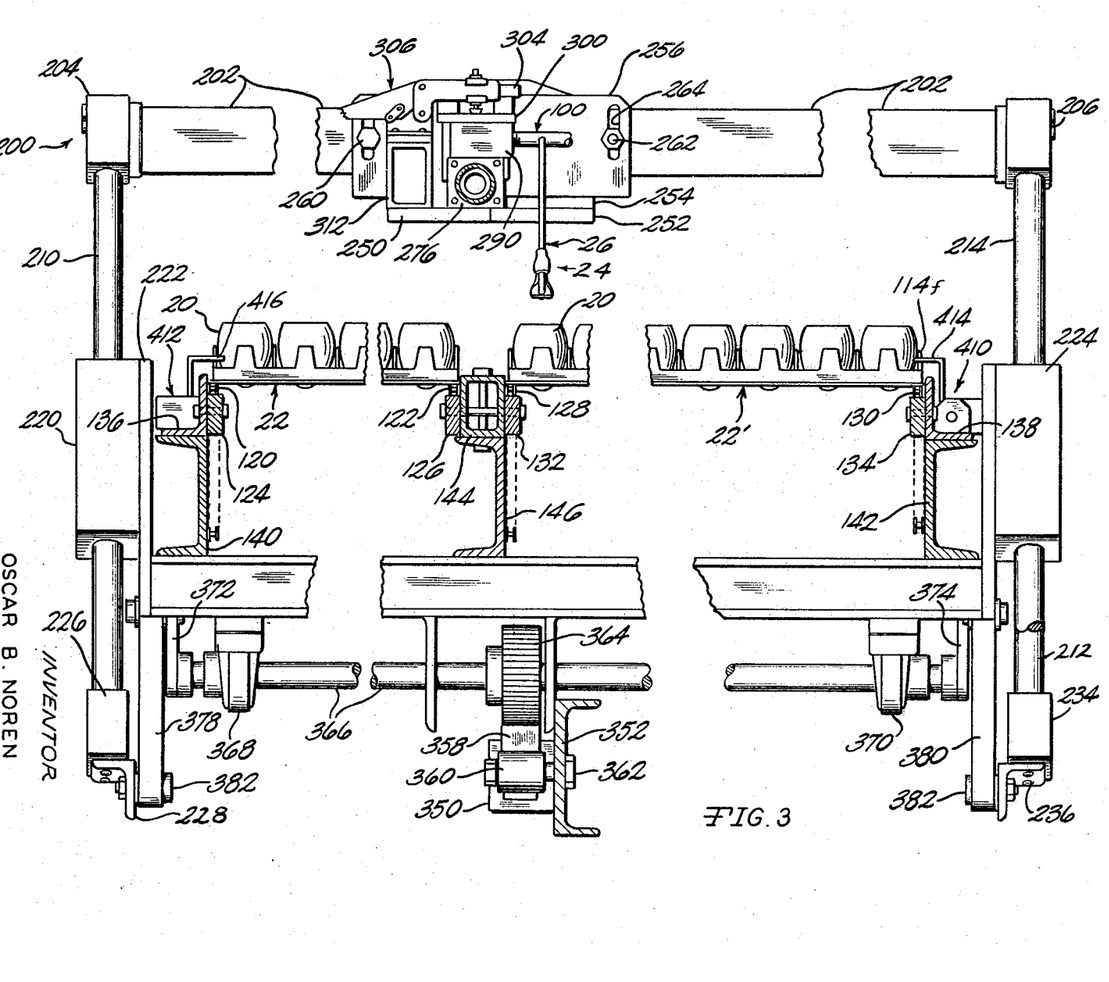

Referring in more detail to FIGS. 1, 2 and 3, and as best seen in the enlarged view of FIG. 1, the harvesting apparatus of the present invention includes one or more aspirating heads 24 each comprising a stainless steel tube 26 and a flexible spoon-like guard 28 carried on the lower end of tube 26 and extending beneath and across the open lower end of the tube. Tube 26 has a straight portion 30 which extends from the lower end 32 of the tube for a distance of about 4½ inches to a curved portion 34 which is bent such that when portion 30 is disposed with its axis 36 inclined at an angle A (FIG. 1) of 10 degrees to the vertical the upper end 38 of tube 26 extends horizontally. Preferably tube 26 is of uniform diameter, having an outside diameter of .250 inch and an inside diameter of about .187 inch. The inlet of tube 26 consists of the lower end opening of bore 39 of tube 26 and two side openings formed by a pair of diametrically opposite semi-circular notches 40 cut in the side wall of the tube adjacent lower end 32. The lower end of tube 26 carries a flap fastener 42 such as a rivet having a shank 44 welded to the downwardly facing side of tube 30 and extending beyond end 32 such that the head of rivet 42 is spaced about 1/16 of an inch below end 32.

Guard 28 of head 24 is a three-piece assembly made up of an inner sleeve 46, a flap 48 and an outer sleeve 52. Sleeve 46 comprises a rubber tube about ¾ of an inch in axial length which is slipped onto tube portion 30 and frictionally secured thereto about ⅝ of an inch above end 32. Flap 48 is preferably made from a rectangular piece of silicone rubber, about ¾ of an inch wide, about 2¼ inches long and about .040 inch in thickness, disposed with its upper end 50 partially wrapped around tube portion 30 and extending downwardly along and spaced from the downwardly facing side of tube portion 30, and thence vertically from the lower end of sleeve 46 about ¾ of an inch to a right angle bend 58 and thence horizontally across end 32 to a terminal edge 56 spaced about ½ inch beyond rivet 42. Flap 48 is secured to tube 26 by slipping sleeve 52 downwardly over the upper end 50 of flap 48, both above and along sleeve 46, so that sleeve 52 holds about the upper third of flap 48 wrapped around sleeve 46 and portion 30. Sleeve 52 is preferably made of a heat shrinkable plastic, such as irradiated high density polyethylene, adapted to withstand sterilization temperatures, and is heated to shrink it into tightly clamped relation around the upper end of flap 48. Flap 48 is also secured to tube 26 by forcing the head of rivet 42 through an aperture in the flap which is smaller than the rivet head.

The above described aspirator head 24 has been found to be an efficient and reliable instrument for aspiration harvesting of the liquid viral products which have been propagated in the semi-developed egg. In influenza virus vaccine production the harvesting operation is performed after the egg has been incubated for a period of thirteen days, the seed virus propagating in the allantoic liquid contained within the allantoic membrane of the egg during the last two days of this period. Referring to FIG. 9, an egg 20 is shown ready for harvesting, the upper end of its shell 60 having been severed along a horizontal cut line 62 in a plane perpendicular to the egg axis about ¼ inch below the upper end of the egg. A generally rectangular opening 66 is formed in the upper surface of the allantoic membrane 64, opening 66 being about ¼ inch wide (parallel to the plane of the drawing) and about ½ inch long (perpendicular to the plane of the drawing) with its inner edge running across the center of the egg. At this stage in its development the egg contains within its allantoic membrane 64 a yolk sac 68, an embryonic sac 70 containing the partially developed chick embryo 72 and an albumen sac 74 at the lower end of the egg, the balance of the space within membrane 64 being filled with allantoic liquid 76. Since the chick embryo 72 is fed by yolk 68 much of this will have been consumed in the growth of the embryo 72 by the time the egg is ready for harvesting, and hence yolk 68 may be above, beside or even below the embryo 70, and the yolk is rather slack and shapeless by this time. Also, by this time the egg white has become the clear allantoic liquid 76. The seed virus grows and multiplies in liquid 76 and it is this material which is aspirated for subsequent centrifuging and further processing into influenza virus vaccine. The average egg will contain about 8 cubic centimeters of this liquid when ready for harvesting.

In accordance with the present invention, liquid 76 is harvested by aspirator head 24 by lowering tube 26 lower end first axially along a path of travel inclined at about 10 degrees from the vertical and intersecting the plane of cut line 62 about ¼ inch radially outwardly from the longitudinal axis of the upright egg 20, this point of entry preferably being about the midpoint of opening 66 in the upper surface of membrane 64. After guard 28 has reached opening 66, tube 26 is inserted straight along this inclined path of travel until end portion 54 of flap 48 is about 1¼ inches below cut line 62, or about ⅝ of an inch above the bottom of the egg. When tube 26 is inserted into the egg in the above manner, guard 28 acts as a yieldable deflector which plows ahead of the open lower end 32 of tube 26, the same gently pushing to one side the yolk 68 and then the embryo sac 70 so that these organs are displaced from their random natural positions such as shown in FIG. 9 laterally of the egg to their positions as shown in FIG. 1. Yolk 68 in some cases may even be shoved by the camming action of guard 28 so that a portion of it protrudes above cut line 62, as shown in FIG. 1.

It has been found that the radially offset entry of tube 26, the 10 degree inclination of the tube's path of travel toward the closest adjacent side of the egg and the disposition of flap 48 along the side of tube 26 which faces the diametrically opposite far side of the egg cooperate to insure the aforementioned lateral displacement of the organs within the egg without puncturing or breaking the same even though the position of the yolk 68 and embryo sac 70 normally varies considerably from egg to egg. Also, due to the leading portion 54 of flap 48 projecting generally horizontally about ¼ inch outwardly from each of the side inlets 40 and a like distance from the front and rear surfaces of tube 26 below end 32, guard 28 shields the tube inlet from the larger solid materials in the egg so that the inlet does not become blocked or clogged. When tube 26 is being inserted into the egg, the solid contents of the egg may force end portion 54 of flap 48 against the end of tube portion 30, but the side access to the bore 39 provided by notches 40 will remain open since the pressure exerted by the eggshell will curl the free end of flap 54 up generally as shown in FIG. 1 which will tend to maintain it generally flat across the end of the tube perpendicular to the axis of bore 39 as shown in FIG. 1. Hence liquid 76 can flow unobstructed to the side ports of the tube inlet and then be sucked up through tube bore 39 for discharge from the upper end 38 thereof to a conduit system as described in more detail subsequently herein.

Preferably the upper end 38 of tube 26 is connected to a continuous source of subatmospheric pressure so that a suction pressure in the order of two inches of mercury exists at the inlet of tube 26 throughout its travel within the egg on both its insertion and withdrawal strokes. Preferably tube 26 is allowed to remain stationary at the bottom limit of its travel for about four seconds, and then is rather rapidly withdrawn back along the inclined linear path by which it was inserted in the egg until the tube is completely clear of the egg as illustrated in FIGS. 2 and 3. Although greater latitude is possible with respect to the inclination and positioning of aspirator head 24 when the same is hand manipulated, the above described insertion orientation and procedure becomes much more critical when head 24 is automatically operated in a mechanized harvesting operation, particularly when simultaneously harvesting a plurality of eggs wherein the random orientation of the organs within the egg as well as the egg tray positioning tolerances introduce aggregate variables. However, by employing head 24 as described above in conjunction with the other features of the harvesting machine of the invention as described hereinafter, the problems presented in attempting to mechanize and automate manual harvesting have been successfully overcome.

PLURAL TUBE ASPIRATOR

In accordance with another feature of the present invention, a plurality of the above described aspirating heads 24 are combined in a unitary assembly with a common manifold to provide a plural tube aspirator 100 for manual or machine manipulation to simultaneously harvest viral products from a like number of eggs. As shown by way of example herein, aspirator 100 has six heads 24 (FIG. 4) secured at their upper ends 38 to a common manifold tube 102 so as to extend perpendicular therefrom at equal intervals along tube 102. Tube 102 preferably comprises ½ inch O.D. stainless steel tubing and is closed at one end 104 thereof and open at its other end 105 (FIG. 5) for communication with a suitable source of subatmospheric pressure. Tubes 26 are spaced apart (center-to-center) about 1⅞ inches in a direction parallel to the axis of tube 102 when intended for harvesting of a transverse row of six eggs 20 arranged upright on the tray 22 described in more detail subsequently herein. Preferably upper end 38 of tube 26 is inserted into a side port 106 in tube 102 disposed midway between the top and bottom surfaces of tube 102 when it is disposed horizontally (FIG. 1) with end 38 also extending horizontally to its junction with tube 102. This arrangement permits an array of a plurality of aspirators 100 to be compactly mounted on a carriage 200 of the machine as described in more detail hereinafter. However, the location of outlet 38 of tube 26 in tube 102 can be varied so long as it is disposed above the floor of tube 102. It has been found that by locating ports 106 spaced above the floor of tube 102 eggshell chips or other solid debris sucked up tube 26 do not clog outlets 38 of the other heads communicating with the same tube 102, and run-back of aspirated liquid between tubes 26 connected to the same tube 102 is also prevented.

Aspirator 100, whether hand held or supported on carriage 200, is preferably disposed with tube 102 horizontal and tubes 26 dependent therefrom with their straight portions 30 at the aforementioned 10 degree inclination, the six heads 24 being inserted and withdrawn, while connected via tube 102 to a continuous source of subatmospheric pressure, into and from eggs 20 as described previously, thereby simultaneously aspirating 7 to 10 cubic centimeters of the infected liquid 76 from the eggs.

AUTOMATIC HARVESTING MACHINE

Figure 4:
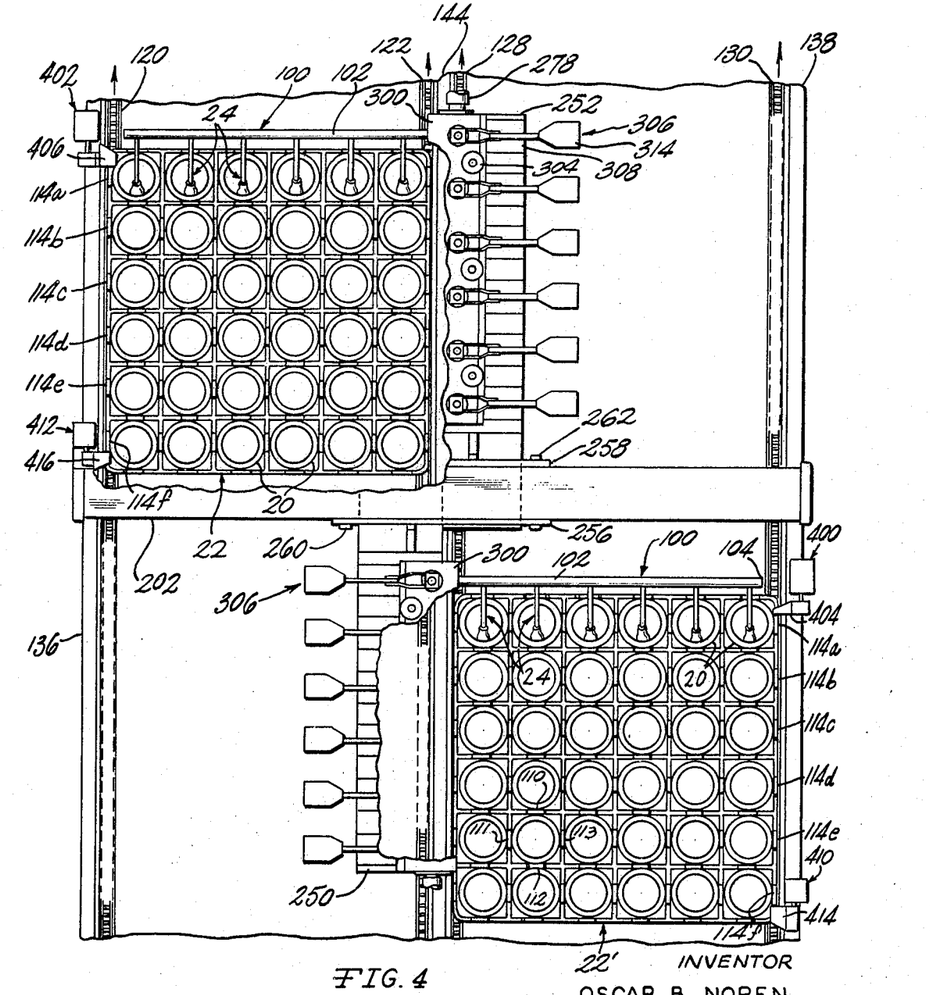

The machine of the present invention is equipped with a plurality of the plural tube aspirators 100, for example twelve, and is operable to automatically transport, locate, fixture and simultaneously harvest seventy-two eggs supported upright in two lots of thirty-six one on each of two identical trays 22 and 22', as best seen in FIGS. 2, 3 and 4. Although the tray for supporting the eggs may take various forms, a commercially available tray 22 made by James Manufacturing Company of Fort Atkinson, Wis. is preferred, the same being accurately molded from plastic material to a square shape in plan configuration and adapted to support thirty-six hens' eggs arranged upright in six parallel transverse rows with six eggs in each row. Tray 22 has transverse and lengthwise partitions which subdivide the same into thirty-six equal size square compartments, each of which is bounded by four fingers 110, 111, 112 and 113 (FIGS. 1 and 4) extending upright from the boundary walls of the compartment at 90 degree intervals to form lateral supports for maintaining an egg upright in each compartment. The six fingers 114a, 114b, 114c, 114d, 114e and 114f along each side edge of tray 22 are equally spaced from one another and each of these fingers bears the same orientation to the adjacent egg compartment.

CONVEYOR MECHANISM

Referring to FIGS. 2, 3 and 4, the machine includes a conveyor mechanism for supporting and transporting trays 22 and 22' on two side by side roller chain conveyors along parallel horizontal paths through the machine. The left hand conveyor (as viewed in FIG. 3) for tray 22 includes two endless roller chains trained on sprockets (not shown) so that their respective upper runs 120 and 122 are supported for horizontal parallel travel on rails 124 and 126 respectively. The right hand conveyor for tray 22' likewise has a pair of upper chain runs 128 and 130 supported for parallel horizontal travel on rails 132 and 134 respectively at the same elevation as runs 120 and 122, each of the runs being driven continuously at the same rate in the directions of the arrows of FIGS. 2 and 4. Outer rails 124 and 134 are respectively fixed to angle iron guides 136 and 138 (FIG. 3) which in turn are mounted on horizontal channels 140 and 142 of a suitable framework adapted to support the machine at a convenient elevation from the floor. Center rails 126 and 132 are fixed to opposite sides of a central box beam 144 mounted on a channel 146 of the machine framework. The upright flanges of guides 136 and 138 and the vertical sides of box beam 144 extend a short distance above runs 120, 122, 128 and 130 to provide side guides therefor as well as for the side edges of trays 22 and 22' to maintain the trays oriented with their sides parallel to tray travel. The undersides of trays 22 and 22' are smooth and rest adjacent their side edges on runs 120, 122 and 128, 130 respectively. The trays are frictionally propelled by the chain runs for movement into the diagonally staggered dual work stations of the machine (FIGS. 2 and 4) where the trays are held stationary in predetermined fixed positions by stop mechanisms 400 and 402 described subsequently herein, the chain runs continuing to run slidably beneath the trays to frictionally bias the trays against the stops during the harvesting operation.

ASPIRATOR CARRIAGE

The machine includes a carriage 200 (FIGS. 2, 3 and 4) operable to support two banks of six aspirators 100 for movement in unison, one over each of the dual work stations of the machine. Carriage 200 straddles both conveyors and includes a cross beam 202 which extends horizontally above the dual conveyors perpendicular to their paths of travel. Beam 202 is secured at its opposite ends to blocks 204 and 206 respectively, block 204 being carried on the upper ends of a pair of guide rods 208 and 210 disposed at a 10 degree incline from the vertical along the left hand side of the conveyor framework as viewed in FIG. 3, block 206 being similarly supported on the upper ends of a pair of rods 212 and 214 disposed in like manner at the right hand side of the conveyor. Rods 210, 212 slide axially in parallel guideways 216 and 218 of a guide block 220 mounted on a plate 222 rigidly secured to the framework of the machine, rods 214 being likewise slidably mounted in a guide block 224 fixed to the machine framework on the right hand side of the conveyor as viewed in FIG. 3. The lower ends of rods 208, 210 are received in a block 226 secured to an angle bracket 228 which in turn is fastened to the lower ends of the rods by screws 230 and 232 (FIGS. 2 and 3). A similar block 234 and bracket 236 are secured to the lower ends of rods 212 and 214. Brackets 228 and 236 are in turn carried and driven by a drive mechanism described in more detail hereinafter.

Cross beam 202 is disposed with its top and bottom surfaces horizontal and rigidly carries fore and aft cantilever platforms 250 and 252 respectively. The inner ends of platforms 250 and 252 laterally overlap and are bolted to the underside of a mounting bracket comprising a horizontal plate 254 welded to the lower edges of a pair of vertical plates 256 and 258 disposed one against each of the opposite vertical side faces of cross bar 202, the bracket being adjustably secured by bolts 260 and 262 which extend through beam 202 and vertical slots 264 in plates 256 and 258. Platforms 250 and 252 each carry a removably clamped array of six aspirators 100, the same being identical except for being reversed at the ends of tubes 102 to adapt the aspirators for their right and left hand mountings on the carriage.

Figure 5:
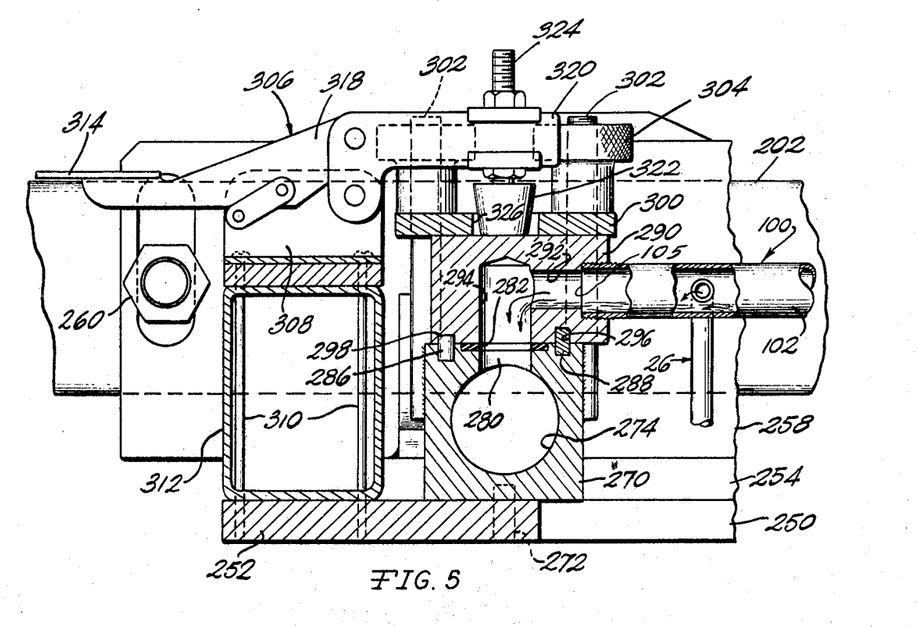
FIG. 5 is a vertical section taken on the line 5—5 of FIGS. 1 and 2.
Figure 6:
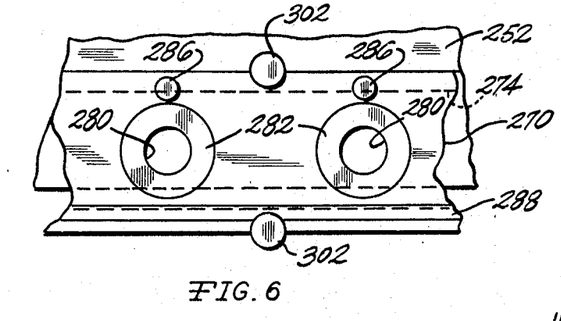
FIG. 6 is a fragmentary plan view taken on line 6—6 of FIG. 7.

Each platform 250, 252 (FIGS. 1, 2, 4, 5, 6 and 7) carries a main manifold 270 which extends almost the full length of the platform and has a flat underside provided with locating holes which receive pins 272 when seated on the flat upper surface of the platform. Manifold 270 has an axial bore 274 closed at its inner end closest beam 202 and communicating at its outer end via an end plate fitting 276 with a suction hose 278 (FIGS. 2 and 4). Six equally horizontally spaced passages 280 extended vertically upwardly from bore 274 to the flat upper face of manifold 270, and a seal washer 282 seats in a counterbore 284 at the upper end of passage 280. Six mounting pins 286 are secured to manifold 270 one adjacent each of the passages 280, and a locating rail 288 is secured to manifold 270 so as to project from the upper face thereof along the opposite sides of the row of passages 280 (FIGS. 5 and 6). Each aspirator 100 has a mounting block 290 (FIG. 5) threadably secured to the open end 105 of tube 102. A horizontal passage 292 in block 290 communicates with end 105 of tube 102 and intersects a vertical blind bore 294 which opens at the lower face of block 290. Each block 290 is provided with a transverse slot 296 and a hole 298 adapted to respectively receive key rail 288 and pin 296 therein when the lower face of block 290 is seated on the upper face of manifold 270 (FIG. 5) to thereby accurately register passage 294 with passage 280 and thus connect tube 102 to bore 274.

Figures 7, 8:
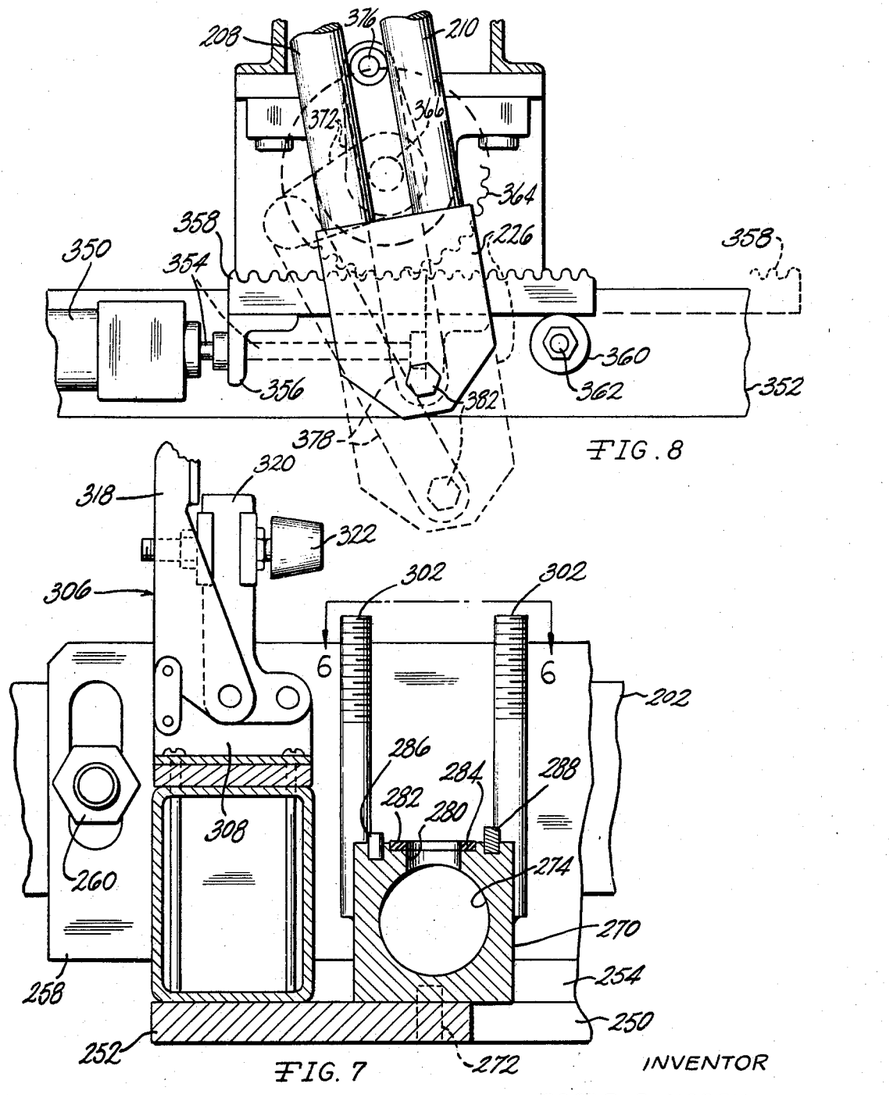
FIG. 7 is a vertical section similar to FIG. 5 but showing the toggle clamp of FIG. 5 in its released position, the associated plural tube aspirator subassembly being removed from the carrier in this view.
FIG. 8 is a fragmentary side elevational view of the carrier drive mechanism.

Each of the six plural tube aspirators 100 are assembled in this fashion at equally spaced intervals along the top of manifold 270 as best seen in FIGS. 2 and 4, and then are secured to the manifold by a clamping plate 300 which overlies all six blocks 290. Plate 300 is apertured to slip onto the upper ends of six mounting studs 302 which are welded at their lower ends three to each side of manifold 270 (FIGS. 1, 5 and 7). Six thumb screws 304 are then threaded down, one on each bolt 302, to draw plate 300 against blocks 290 and thus hold the six aspirators 100 assembled to manifold 270 so that these parts may be removed as a unit from platform 252 for cleaning and sterilization.

The assembly of six aspirators 100 is then securely but removably clamped on pins 272 against the upper surface of platform 252 by six manually actuated toggle clamps 306, which are commercially available clamps such as Knu-Vise Model No. H–200 clamps made by Lapeer Manufacturing Co. of Lapeer, Mich. Each clamp 306 has a base 308 mounted by screws 310 on a box beam platform 312, the lower ends of screws 310 threading into platform 252 to secure beam 312 thereto alongside manifold 270. Each clamp 306 has a finger grip 314 for manipulating an arm 318 from a vertical release position shown in FIG. 7 to a horizontal over-center clamping position shown in FIG. 5. This movement of arm 318 pivots a clamping arm 320 from its raised released position in FIG. 7 to its horizontal clamping position shown in FIG. 5 wherein a hard rubber button 322 adjustably secured by screw 324 to arm 320 projects through a registering hole 326 in plate 300 into engagement with the upper surface of block 290 to thereby exert clamping pressure on block 290 against manifold 270. Clamps 306 thus releasably secure the entire array of six plural tube aspirators 100 in a cantilever type mount on platform 252 and also exert localized clamping pressure on each block 290 to insure a tight seal between passages 294 and 280.

When thus mounted aspirators 100 are oriented with tubes 102 horizontal and parallel and tubes 26 extending downwardly at a 10 degree incline from the vertical, and thus parallel to the direction of travel of carriage 200 as the same is reciprocated by rods 208–214. The manifold 270 mounted on platform 250 has its outlet fitting 276 secured to a second suction hose 279, and the remote ends of hoses 278 and 279 are connected to a continuous source of subatmospheric pressure to thereby induce a flow of liquid from the eggs into the inlet 40 of each tube 26 when the inlets are submerged in liquid 76 of the eggs. The liquid flows upwardly via tube 26 into tubes 102 and thence inwardly along tube 102, through passages 292, 294 and 280 into bore 274 of manifolds 270 and thence along bores 274 to the respective suction hoses 278 and 279 which deliver the aspirated liquid to a common processing area where it is centrifuged and then further processed into influenza virus vaccine.

DRIVE MECHANISM

The drive mechanism for carriage 200 is shown in FIGS. 3 and 8 and includes a double acting pneumatic power cylinder 350 fixed to a channel 352 of the machine framework. Cylinder 350 contains a piston (not shown) which drives a plunger 354 horizontally between the positions thereof shown in solid and broken lines respectively in FIG. 8. A right angle bracket 356 is secured to the end of plunger 354 and supports one end of a rack 358. The underside of rack 358 tracks on a roller 360 journaled on a bolt 362 secured to channel 352. The teeth of rack 358 mesh with those of a spur gear 364 fixed to a shaft 366 journaled near its ends in spaced brackets 368 and 370 fixed to the framework of the machine. Cranks 372 and 374 are respectively fixed to the opposite ends of shaft 366 in the same angular positions and are linked by pins 376 to connecting rods 378 and 380 respectively. Rods 378 and 380 are in turn pivotally connected at their lower ends by pins 382 to the associated brackets 228 and 236 to thereby articulately link drive shaft 366 with the pairs of rods 208, 210 and 212, 214. Preferably cranks 372, 374 and links 378, 380 are oriented so that when rack 358 is at the lower limit of its travel the linkage is extended with the centers of shaft 366 and pins 376 and 382 aligned, i.e., the bottom dead center position of the linkage wherein rods 208–214 are lowered to the bottom of their stroke and the aspirating heads 24 on carriage 200 have penetrated the eggs to the position shown in FIG. 1. When rack 358 is actuated by cylinder 350 to the opposite end limit of its horizontal travel, pinion 364 is driven thereby to rotate shaft 366 and, via linkage 372, 378, lift rods 208–214 on their upstroke to thereby elevate the carriage to its raised position shown in FIGS. 2 and 3.

Preferably the total travel of carriage 200 is about 3 inches, the lower ends 32 of tubes 26 being poised about 1¾ inches above the upper edges 62 of the decapitated eggs 20 in the raised position of the carriage. The drive mechanism is adjusted to drop the carriage rapidly from its raised position during the 1½ inches of its descent, and thereafter to slow down appreciably so that guards 28 contact the upper surface of the membrane 64 and enter the liquid 76 in the egg at a slower speed, the descent from this point on to the lowermost position being gradual, on the order of ½ inch per second, the total time for the carriage to descend on its insertion stroke being on the order of four seconds. The drive mechanism effects a pause at the bottom of the stroke for a period of about four seconds, and then effects a rapid upstroke of the carriage to return it to its raised position, thereby withdrawing the tubes 26 on through their lift stroke in about two seconds.

TRAY POSITIONING MECHANISM

The mechanism for fixturing trays 22 and 22′ at the two staggered work stations of the machine includes a pair of substantially identical stop mechanisms 400 and 402 (FIGS. 4 and 2), such as those disclosed in detail in my copending application Ser. No. 605,632, filed Dec. 29, 1966, entitled "Machine for Injecting Influenza Seed Virus Into Eggs or the Like," as well as my copending application Ser. No. 605,888, filed Dec. 29, 1966, entitled "Machine for Opening Eggs to Permit Removal of Viral Products Therefrom," the same not forming part of the present invention and therefore not shown and described in detail herein. Briefly, stop mechanisms 400 and 402 respectively include solenoid and spring actuated fingers 404, 406 which pivot between a tray blocking position intersecting the path of travel of the outer side fingers **114*a*–114*f* of trays 22 and 22′ (FIGS. 4 and 2), and a tray release position wherein fingers 404 and 406 pivot clear of the path of travel of these tray fingers. Stop mechanisms 400 and 402 are mounted on guides 138 and 136 respectively and are positioned so that when lead fingers 114*a* abut the associated fingers 404 and 406, trays 22′ and 22 are properly located so that the decapitated eggs carried thereon are properly aligned for insertion of tubes 26** individually into the open upper ends of the eggs as described previously.

Stop mechanisms 400 and 402 are respectively controlled by associated tray sensing mechanisms 410 and 412 respectively which are mounted on guides 138 and 136 a predetermined distance in advance of units 400 and 402 relative to the direction of tray travel. When the leading finger 114a of tray 22' strikes finger 404 of stop mechanism 400, and likewise when the leading finger 114a of tray 22 strikes stop finger 406, travel of the respective trays is halted. The frictional force exerted by chain runs 128 and 130 on tray 22' and by chain runs 120 and 122 on tray 22 continuously urges these trays against the respective stop fingers to thereby frictionally fixture the trays in properly oriented position in the diagonally staggered dual work stations of the machine for entry of the two banks of dip tubes 26 into the eggs 20 supported upright in the egg compartments of the trays.

CYCLE CONTROL MECHANISM

The detailed operation of the machine through a complete harvesting cycle will become apparent from the following description of the cycle control mechanism of the machine. The mechanism 410 for sensing the position of tray 22' and the mechanism 412 for sensing the position of tray 22 are similar to the sensing mechanisms disclosed in my aforementioned copending applications and operate in a like manner. Briefly, mechanism 410 has a sensing finger 414 (FIGS. 3 and 4) pivotally mounted and yieldably biased into the path of travel of side fingers 114a–114f of the trays, and is adapted to be pivoted by these tray fingers from a horizontal position as shown in FIG. 3 upwardly and outwardly to permit tray fingers 114a–114f to move past sensing finger 414. When finger 414 is pivoted from its horizontal position, it actuates a switch of mechanism 410 which is connected to a conventional first stepping relay (not shown), which is operable to control the solenoid of stop mechanism 400 as well as a first control relay (not shown) in an energizing circuit of a solenoid operated valve of air cylinder unit 350 as described in more detail hereinafter.

The first stepping relay has a seven index cycle and is connected in the usual manner to the sensing mechanism so that each time finger 414 drops in behind one of the side fingers 114a–114f, the relay indexes once. The fifth position terminals in the output circuit of the first stepping relay are connected to stop mechanism 400, and hence the fifth time the relay is so actuated (when finger 114 drops in behind tray finger 114e) the first stepping relay indexes to its fifth position and causes finger 404 to drop from its tray release to its tray blocking position, finger 404 being spaced ahead of lead finger 114a at this time by about the distance between an adjacent pair of tray fingers 114a–114f. When sensing finger 414 drops behind the sixth side finger 114f, the first stepping relay indexes to its sixth position to produce a second output signal which energizes the first control relay so that it closes its normally open contacts in an energizing circuit for the solenoid of the control valve which controls the supply of air to, and exhaust of air from, the cylinder 350 to initiate the downstroke of carriage 200. The first control relay is thus actuated simultaneously with tray 22' being stopped by finger 404 engaging the lead finger 114a.

The sensing finger 416 of sensing mechanism 412 operates in a like manner relative to tray fingers 114a–114f of tray 22 and is connected to a second stepping relay identical to the first stepping relay which in response to finger 416 dropping off the fifth tray finger 114e causes mechanism 402 to drop finger 406 into tray blocking position. When sensing finger 416 drops behind the sixth tray finger 114f, the second stepping relay is indexed a sixth time to produce a second output signal which actuates a second control relay which closes its normally open contacts, the same being serially connected with the contacts of the first control relay in the energizing circuit for the solenoid of the control valve of unit 350. Hence when the contacts of the second control relay are closed, a circuit is completed for energizing the solenoid of the control valve to actuate plunger 354 of the air cylinder 350 through its driving stroke to thereby lower carriage 200 and the associated dual array of seventy-two dip tubes 26 from the raised position of FIG. 2 to the fully inserted positions thereof shown in FIG. 1. The first and second control relays thus form the equivalent of a logic "and" gate for initiating the machine cycle, thereby requiring that tray 22 and tray 22' both have reached their respective work stations in the machine and be properly frictionally fixtured therein as described previously before the machine cycle can start.

In order to effect the aforementioned four-second pause at the bottom of the carriage stroke, a suitable timer or conventional time delay relay (not shown) is provided having a pair of normally closed contacts connected in series with the contacts of the first and second control relays and the solenoid of the valve of unit 350. The time delay relay has its coil also connected in series with the contacts of the first and second control relays but in parallel with its own normally closed contacts and the solenoid of the valve of unit 350 so that when said contacts of both control relays are closed the coil of the time delay relay is energized at the same time that the solenoid of the air control valve of unit 350 is energized. Hence when the valve of unit 350 is actuated to initiate a downstroke of carriage 200, the time delay relay "times-in" to initiate an eight-second time delay period which must expire before the time delay relay opens its normally closed contacts. Cylinder 350 is suitably adjusted so that it effects the downstroke of the carriage 200 in a matter of four seconds. Hence when the carriage reaches the bottom of its stroke it will remain in this position due to the continued supply of air thereto maintaining rack 358 at the end of its drive stroke for the remaining four seconds of the eight-second delay period. When the time delay relay "times out," its contacts open and thereby de-energize the solenoid of the valve of unit 350. This actuates the valve to its opposite condition to supply air to the return chamber and to exhaust air from the driving chamber of air cylinder 350, thereby retracting plunger 354 to its initial position and thus elevating carriage 200 from its lowered position shown in FIG. 1 to its raised position shown in FIG. 2.

As rod 208 nears the upper limit of its travel on its ascent toward the raised position, an arm 420 (FIG. 2) secured to rod 208 below guide 220 strikes the movable finger 422 of a limit swich 424 secured to channel 140 to thereby actuate the switch. Switch 424 in turn is operably connected in a control circuit connected to the first and second stepping relays so that when switching 424 is so actuated, the stepping relays are simultaneously energized to cause them both to index to their seventh or zero position, thereby deenergizing the first and second control relays so that their associated contacts open. Hence plunger 354 remains in its retracted position even though the contacts of the time delay relay now return to their normally closed position due to the coil of the time delay relay being deenergized by the opening of the contacts of the first and second control relays. The resetting of the stepping relays to their zero position also causes the same to actuate the associated stop mechanisms 400 and 402 so that they simultaneously retract their associated stop fingers 404 and 406 out of the path of travel of the tray side fingers 114a–114f. When both of the trays 22 and 22' are so released, the continuously running chains 120, 122, 128 and 130 frictionally propel the harvested trays forward out of their respective work stations of the machine to a disposal area.

From the foregoing description, it will now be apparent that the present invention provides improved apparatus for harvesting liquid viral products from eggs or the like in a rapid and efficient manner, the machine operating "on demand" whenever two trays full of eggs have reached their respective work stations and are ready for the insertion of the aspirating heads 24. The embodiment of the machine disclosed herein is capable of aspirating seventy-two eggs in a cycle of approximately thirteen to fourteen seconds and hence has an output of 575 to 600 eggs per minute without requiring any manuual handling of the eggs.

I claim:
1. Apparatus for harvesting liquid-entrained virus from an egg prepared for harvesting with an access opening in the upper end of said egg, including in combination means for supporting the egg in an upright position and with the access opening generally horizontal and facing upwardly and with the egg stationarily located at a predetermined location in said upright position at a work station, carriage means movable generally vertically between raised and lowered positions above said position of said egg at said work station and along a path of travel inclined at about 10 degrees relative to the upright position of the egg, drive means for moving said carriage means on a downstroke from said raised to said lowered position and then on an upstroke from said lowered to said raised position, aspirating means carried on said carriage means including a rigid tube having a straight portion extending downwardly from said carriage means generally aligned with the path of travel of said carriage means, said tube having means forming an inlet adjacent the lower end thereof and disposed above the position of the egg opening in the raised position of said carriage means, said tube being disposed such that said inlet means enters the opening in the egg on said downstroke and is submerged in the allantoic liquid of the egg above the bottom of the egg at the bottom of said downstroke, and mean connecting said tube to a source of subatmospheric pressure when said inlet means of said tube is submerged in said liquid of the egg.

2. The apparatus set forth in claim 1 wherein said means for supporting said egg includes horizontal conveyor means for transporting the egg upright with the open end thereof horizontal and facing upwardly along a horizontal path of travel below the raised position of said inlet means of said aspirating means through said work station, and means for stopping travel of the egg at said work station and maintaining the egg stationary in said predetermined harvesting position thereof.

3. The apparatus set forth in claim 2 including means for synchronizing said carriage drive means with said conveyor means such that said carriage drive means reciprocates said carriage means through a downstroke and then an upstroke after said conveyor means has stationarily positioned the egg in said predetermined harvesting position thereof.

4. The apparatus set forth in claim 1 wherein said carriage means reciprocates on said upstroke and downstroke thereof in a linear path inclined at about 10 degrees to the vertical, and wherein said tube is oriented with said straight portion thereof parallel to the path of travel of said carriage.

5. The apparatus set forth in claim 3 wherein said straight portion of said tube is oriented such that said inlet means thereof intersects the opening of the egg when in said predetermined harvesting position at a point generally between the center thereof and the side of said egg toward which said straight portion is inclined.

6. The apparatus set forth in claim 3 wherein said carriage drive means is operable to move said carriage means on the order of one-half second per inch during the portion of said downstroke thereof when said inlet means is between the opening of the egg and the bottom of said downstroke then to cause said carriage means to pause at the bottom of said downstroke, and then to travel through said upstroke at a faster rate than on said downstroke.

7. The combination set forth in claim 3 wherein said travel of said carriage means is at least about 1½ inches, and said tube is positioned on said carriage means such that said inlet means thereof travels to a point about 1¼ inches below the position of the opening in the egg.

8. The combination set forth in claim 3 wherein said inlet means comprises a circular end opening in the lower end of said straight portion of said tube and side inlet ports in the side wall of said tube spaced diametrically opposite one another at said end opening, and said asiprating means further includes guard means secured at one end thereof to said straight portion having shield means extending from said one end of said guard means downwardly along one side of said straight portion and then across the lower end of said tube below said inlet means of said tube.

9. The combination set forth in claim 1 wherein said aspirating means includes a plurality of said tubes and said eggs supporting means is adapted to support a plurality of said prepared eggs oriented upright in a predetermined array at said work station with said openings facing upwardly, said tubes being oriented on said carriage means for travel therewith along paths individually intersecting the respective positions of the openings in said plurality of eggs, a manifold having a bore extending horizontally, said upper ends of said tubes each communicating with said bore at spaced intervals therealong at an elevation above the lowermost portion of the wall of said bore, said bore communicating with said source of suction to thereby induce via said tubes a subatmospheric pressure at said inlet means of each of said tubes.

10. The combination set forth in claim 9 wherein said manifold comprises a tube with the inner wall thereof defining said bore, said tube being closed at one end and having a mounting block secured to the opposite end thereof, said mounting block having a passageway communicating via said opposite end of said tube with said tube bore and connected to said source of subatmospheric pressure, said mounting block and said carriage means having interengaging mounting surfaces and locating means for removably receiving and locating said mounting block on said carriage means with said manifold extending horizontally from said carriage means, and a toggle clamping mechanism supported on said carriage means and having a clamping member operable between released and engaged positions relative to said mounting block for rigidly clamping said mounting block on said carriage means.

11. Apparatus for harvesting liquid-entrained virus from at least partially incubated egg comprising a rigid hollow tube having a straight portion with a conduit extending axially therethrough, said tube having an outlet communicating with one end of said straight portion and an inlet communicating with an opposite end of said straight portion, and guard means mounted on said straight portion including a flexible flap extending downwardly along and spaced radially outwardly from one side of said straight portion and thence extending across and beyond said opposite end of said straight portion to a point spaced radially outwardly from the side of said straight portion opposite said one side thereof.

12. The apparatus set forth in claim 11 wherein said straight portion of said tube has an axial end opening at said opposite end thereof and a pair of diametrically opposite notches intermediate said one and opposite sides thereof adjacent said axial opening forming side inlets to said conduit.

13. The harvesting apparatus set forth in claim 11 wherein said guard means comprises a first sleeve frictionally secured on said straight portion of said tube spaced above the said opposite end thereof, a flap comprising a rectangular flexible piece of silicon rubber having its upper end partially wrapped around said first sleeve, a second sleeve encircling said upper end of said flap to secure the same on said first sleeve, and means secured to said tube at said opposite end thereof and having a portion extending therebelow connected to said flap to support the lower end of said flap so that it extends transversely across and below said opposite end of said tube, said lower end of said flap projecting laterally radially outwardly from the axis of said tube straight portion 360 degrees therearound, each of said aspirating tubes having a straight portion with a conduit extending axially therethrough communicating with said bore and with an inlet at the lower end of said straight portion, and guard means mounted on said straight portion including a flexible flap extending downwardly along and spaced outwardly from one side of said straight portion and then below said lower end of said straight portion to a point spaced outwardly from the side of said straight portion opposite said one side thereof.

14. The combination set forth in claim 13 wherein said straight portion of said tube is at least about 4 inches long and terminates at said lower end of said tube, said tube having an outside diameter of about .250 inch and an inside diameter of .187 inch in said straight portion thereof, said lower end of said flap having a width transverse to the axis of said straight portion of about three-quarters of an inch, said lower end of said flap being spaced with its transverse edge about one-quarter of an inch radially outwardly from said opposite side of said tube.

15. Apparatus for harvesting liquid-entrained virus from a plurality of eggs having the upper ends thereof opened and oriented in a row with a predetermined spacing between the eggs, said apparatus comprising a rigid manifold tube having a straight bore extending axially therein, a plurality of aspirating tubes secured at one end to said manifold tube at spaced intervals axially therealong, said aspirating tubes communicating with said bore at an elevation above the lowermost portion of the wall of said bore when said bore is disposed in operative position with its axis horizontal and said aspirating tubes extending downwardly therefrom, and means for connecting said bore with a source of subatmospheric pressure to thereby induce via said tubes a subatmospheric pressure in each of said aspirating tubes, each of said aspirating tubes having a straight portion with a conduit extending axially therethrough communicating with said bore and with an inlet at the lower end of said straight portion, and guard means mounted on said straight portion including a flexible flap extending downwardly along and spaced outwardly from one side of said straight portion and then across and below said lower end of said straight portion to a point spaced outwardly from the side of said straight portion opposite said one side thereof.

References Cited

UNITED STATES PATENTS

| | | | |
|---|---|---|---|
| 1,518,211 | 12/1924 | Maue | 128—276 X |
| 2,390,494 | 12/1945 | Briggs et al. | 210—323 |
| 2,477,752 | 8/1949 | Kiss | 119—1 |
| 2,489,067 | 11/1949 | Wild | 128—276 |
| 2,531,730 | 11/1950 | Henderson | 128—276 |
| 2,715,899 | 8/1955 | MacLean | 128—276 X |
| 2,934,069 | 4/1960 | Broman | 128—276 |
| 2,936,757 | 5/1960 | Trace | 128—276 |
| 3,123,045 | 3/1964 | Cosgrove et al. | 119—1 |
| 3,321,087 | 5/1967 | Fuge et al. | 128—350 X |
| 3,377,989 | 4/1968 | Sandhage et al. | 119—1 |

ALVIN E. TANENHOLTZ, Primary Examiner

U.S. Cl. X.R.

23—292; 198—19; 210—459